United States Patent [19]

Hubbard et al.

[11] Patent Number: 4,690,002
[45] Date of Patent: Sep. 1, 1987

[54] DOPPLER SYSTEM FOR MEASUREMENT OF BLOOD FLOW DURING CARDIOPULMONARY BYPASS AND VENTRICULAR ASSIST

[75] Inventors: Lloyd C. Hubbard, Minnetonka; Earl W. Clausen, Wayzata, both of Minn.

[73] Assignee: Minnesota Minning and Manufacturing Company, St. Paul, Minn.

[21] Appl. No.: 863,128

[22] Filed: May 14, 1986

[51] Int. Cl.⁴ .............................................. G01F 1/66
[52] U.S. Cl. .................................. 73/861.25; 128/663
[58] Field of Search ............................. 73/861.25, 900; 128/663

[56] References Cited

U.S. PATENT DOCUMENTS

| | | |
|---|---|---|
| 3,741,014 | 6/1973 | Tamura . |
| 3,914,999 | 10/1975 | Grandchamp . |
| 3,974,692 | 8/1976 | Hassler . |
| 3,987,673 | 10/1976 | Hansen . |
| 4,062,237 | 12/1977 | Fox . |
| 4,122,713 | 10/1978 | Stasz et al. . |
| 4,142,412 | 3/1979 | McLeod et al. . |
| 4,145,925 | 3/1979 | Stasz et al. . |
| 4,147,059 | 4/1979 | Fathauer . |
| 4,257,278 | 3/1981 | Papadofrangakis et al. . |
| 4,265,126 | 5/1981 | Papadofrangakis et al. . |
| 4,333,353 | 6/1982 | Baumoel . |
| 4,391,148 | 7/1983 | Sainz et al. . |
| 4,391,149 | 7/1983 | Herzl . |
| 4,413,531 | 11/1983 | Karplus et al. . |

*Primary Examiner*—Charles A. Ruehl
*Attorney, Agent, or Firm*—Kinney & Lange

[57] ABSTRACT

An ultrasonic Doppler flow measurement system for measuring blood flow in a polymer conduit includes an ultrasonic transmitter transducer, an ultrasonic receiver transducer, an amplifier/detector circuit for producing a Doppler signal which varies in frequency as a function of blood velocity, a clipping circuit, an automatic gain control circuit, and a frequency-to-voltage converter which produces an output signal having a voltage which is a function of flow velocity. The automatic gain control circuit accomodates variations in Doppler signal strength due to varying red blood cell concentration. The clipping circuit prevents an inordinate reduction of gain by the automatic gain control circuit due to extremely large, occasional gas bubbles or fat globules in the blood.

6 Claims, 1 Drawing Figure

DOPPLER SYSTEM FOR MEASUREMENT OF BLOOD FLOW DURING CARDIOPULMONARY BYPASS AND VENTRICULAR ASSIST

BACKGROUND OF THE INVENTION

1. Field of the Invention

This invention relates to systems for measuring blood flow velocity. In particular, the present invention relates to an improved ultrasonic Doppler blood flow measurement system for use during cardiopulmonary bypass and ventricular assist procedures.

2. Description of the Prior Art

The measurement of liquid flow velocity using an ultrasonic Doppler technique has been proposed for many years. Examples of Doppler flowmeter systems are shown in the following U.S. Pat. Nos.: Tamura—3,741,014; Grandchamp—3,914,999; Hassler—3,974,692; Hansen—3,987,673; Fox—4,062,237; Stasz et al—4,122,713; McLeod et al—4,142,412; Stasz et al—4,145,925; Fathauer—4,147,059; Papadofrangakis et al 4,257,278; Papadofrangakis et al 4,265,126; Baumoel—4,333,353; Sainz et al—4,391,148; Herzl—4,391,149; and Karplus et al—4,413,531.

One particularly advantageous application of Doppler flow measurement is in the measurement of blood flow through a polymer conduit (i.e. external to the human body). Examples of applications where blood flow measurement of this type is required include cardiopulmonary bypass surgery and ventricular assist using blood pumps. An ultrasonic Doppler flow measurement system is advantageous in these applications, because the sensor (an ultrasonic transmitter transducer and an ultrasonic receiver transducer) are positioned on opposite sides of the conduit and do not contact the blood. As a result, the sensor can be reused without sterilization. Other flow measurement techniques, which require contact with the blood, require that the portions of the sensor contacting the blood either be sterilized after each use, or disposed and replaced.

An ultrasonic Doppler blood flow measurement system depends upon the presence of particulates, such as red blood cells, air bubbles, and fat globules which act as targets for reflection of the ultrasound from the transmitter transducer to the receiver transducer. The velocity of these particulates will cause a signal frequency shift due to the well known Doppler effect. The signal from the receiver transducer is typically fed to a radio frequency (RF) receiver and amplitude modulation (AM) demodulator. The demodulated signal is then filtered and amplified, and provided to a frequency-to-voltage converter. The frequency of the signal is proportional to the blood flow velocity. The output of the frequency-to-voltage converter is a voltage which is proportional to blood flow velocity, and typically is used to drive or control an output device such as an analog meter or display.

Despite the advantages of an ultrasonic Doppler system for blood flow measurement, the ability to provide a quantitative and continuous measurement of blood flow with such a system on a practical basis has proved extremely difficult. The challenge of developing such a system comes from the wide variability of conditions under which blood flow must be measured, and the fact that the operation of the Doppler flow measurement technique depends upon the presence of particulates in the blood.

Red blood cells are poor reflectors of ultrasound and, as a result, an ultrasonic Doppler flow measurement system requires very sensitive detector circuitry. Air bubbles, however, produce approximately ten times the Doppler signal produced by red blood cells. Fat globules also produce much larger Doppler signals than red cells.

In addition, the concentration of red blood cells in the blood affects the strength of the ultrasound waves reflected to the receiver transducer. Because of the common practice of diluting the patient's blood during cardiopulmonary bypass surgery, the percentage of red blood cells will range from 15 to 40 percent. During ventricular assist, on the other hand, the percentage of red blood cells may exceed 50 percent.

Oxygenators (artificial lungs) used during cardiopulmonary bypass surgery cause air particulates to be injected into the circulated blood. "Bubble" oxygenators, so called because gaseous oxygen is actually injected into the blood, cause a high level of gas particulates. "Membrane" oxygenators, which separate gas and blood by a polymer membrane, produce low levels of gas particulates. Fat particulates in the blood seem to vary from patient to patient.

During ventricular assist, no oxygenator is used. The Doppler signal is the result of reflection only from red blood cells (and whatever fat particulates are in the patient's blood).

SUMMARY OF THE INVENTION

The present invention is an improved ultrasonic Doppler blood flow measurement system which accomodates extreme variation in signal strength, variations in red blood cell concentration, and the presence (in varying degrees) of gas bubbles and fat globbles in the blood.

In the system of the present invention, the Doppler signal from the receiver transducer is demodulated and filtered and then provided to a clipping circuit which clips or limits the incoming Doppler signal to a level similar to the level produced from red blood cells. The clipped signal is then provided to an automatic gain control circuit which accomodates the variations in signal strength which are due to variations in red cell concentration.

The signal is then preferably provided to a frequency-to-voltage converter, which produces a voltage signal which is representative of blood flow velocity.

BRIEF DESCRIPTION OF THE DRAWINGS

The FIGURE is a block diagram of a preferred embodiment of the ultrasonic Doppler blood flow measurement system of the present invention.

DETAILED DESCRIPTION OF THE PREFERRED EMBODIMENTS

Figure 1:
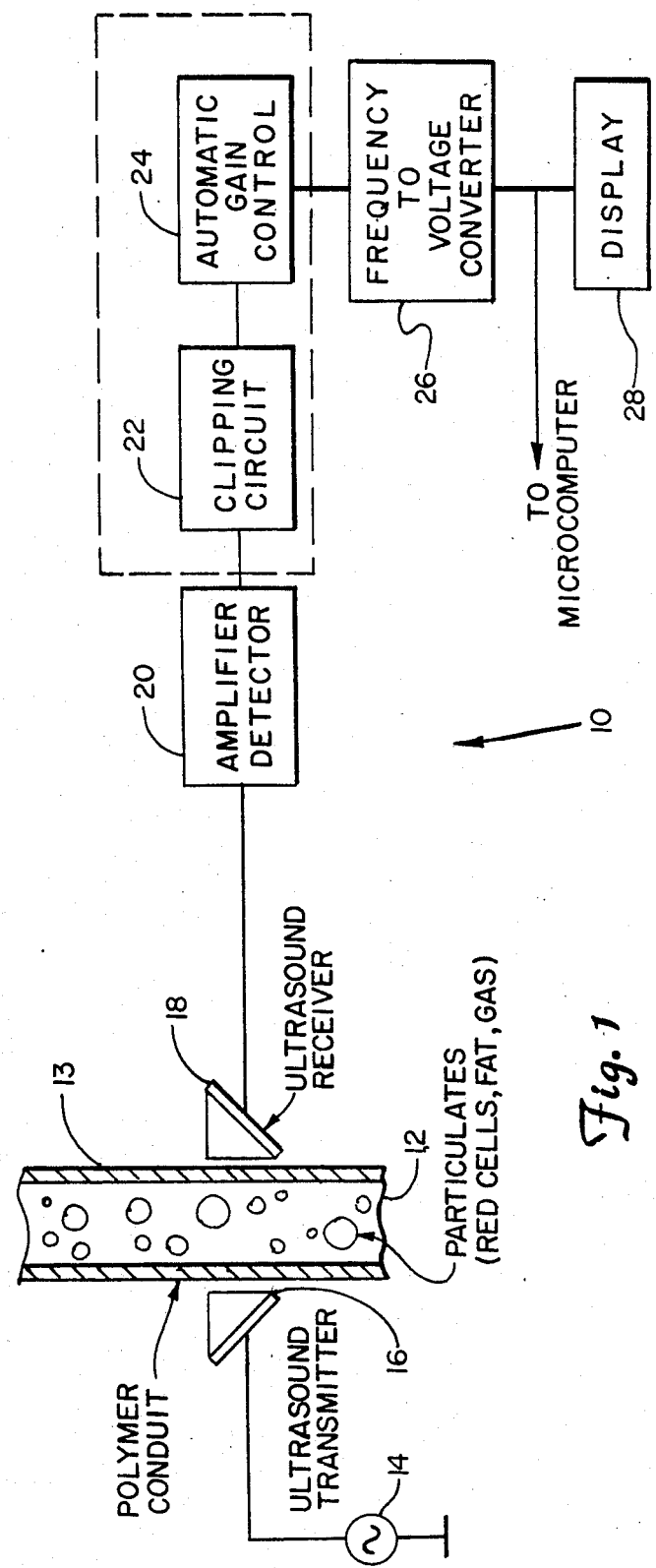

In the embodiment shown in the FIGURE, ultrasonic flow sensing system 10 is an ultrasonic Doppler effect system which provides an output representative of the flow of blood 12 through polymer conduit 13. System 10 includes a continuous wave generator 14 (which preferably produces a signal at 2 MHz or 4 MHz), ultrasonic transmitter transducer 16, ultrasonic receiver transducer 18, amplifier/detector circuit 20, clipping circuit 22, automatic gain control circuit 24, frequency-to-voltage converter 26, and display 28.

Generator 14 drives transmitter transducer 16 to cause ultrasonic waves to be transmitted through polymer conduit 13 into blood 12. The ultrasonic waves are reflected by particulates, such as red blood cells, fat globules, and gas bubbles back to receiver transducer 18. As shown in the FIGURE, transmitter transducer 16 and receiver transducer 18 are positioned on opposite sides of the conduit 13.

The signal from receiver transducer 18 is supplied to amplifier/detector circuit 20. In preferred embodiments, amplifier/detector circuit 20 includes an RF receiver, an AM demodulator, and a band pass filter and amplifier circuit. The band pass filter preferably includes a fifth order Butterworth high pass characteristic and a third order Butterworth low pass characteristic.

The output of amplifier/detector circuit 20 is a Doppler signal having a frequency which is proportional to flow rate (i.e. the velocity of blood 12 flowing through conduit 13). The frequency f of Doppler signal is given by the following relationship: $f = 2v \cos \phi f_c/c$; where $v$ = velocity of blood, $c$ = velocity of ultrasound in blood, $\phi$ = blood entry angle of the ultrasound, and $f_c$ = carrier frequency of the ultrasound.

As discussed previously, the problem with prior art ultrasonic blood flow measurement systems has been the extreme variation in Doppler signal strength. This variation results from a number of factors, including the difference in reflectance between red blood cells, air bubbles, and fat globules; the different concentration of red blood cells depending on the particular application (cardiopulmonary bypass surgery versus ventricular assist); the different concentrations of gas bubbles depending on the type of oxygenator used; and the variation in concentration of fat globules from patient to patient.

With the present invention, this extreme variation in signal strength is accommodated by the addition of automatic gain control circuit 24 and clipping circuit 22. Automatic gain control (AGC) is a well known technique in many fields, and is widely used in radio receivers.

It has been discovered, however, that the use of automatic gain control in a Doppler blood flow measurement system creates problems and inaccuracies. In particular, when fat globules or gas bubbles occur in bursts, followed by blood containing red blood cells alone, the bursts cause the automatic gain control to reduce the gain of the receiver so that the signals produced by the red blood cells which follow the bursts will be missed until the automatic gain control recovers to its original red blood cell gain level. This situation has been found to cause severe inaccuracies in the blood flow readings.

As a result, the present invention combines clipping circuit 22 with automatic gain control circuit 24. Clipping circuit 22 clips or limits the incoming Doppler signal to a level which is similar to the level normally received from red blood cells. This prevents automatic gain control circuit 24 from reducing the gain in the presence of occasional gas bubbles or other non-red blood cell particulates. It has been found that the combination of clipping circuit 22 and automatic gain control circuit 24 has overcome the prior limitations and shortcomings of ultrasonic blood flow measurement systems, and has resulted in this system 10 which provides highly accurate blood flow measurement.

The resulting Doppler signal, after clipping and automatic gain control amplification, is provided to frequency-to-voltage converter 26. The output of converter 26 is a voltage having a magnitude which is a function of blood velocity. The voltage output is supplied to display 28, which in one embodiment is a bar graph display. The result is a visual indication of the blood velocity through polymer conduit 13.

As shown in the FIGURE, the voltage output signal also is preferably provided to a microcomputer (not shown). The voltage output is converted to a form which can be used by the microcomputer, either by use of an analog-to-digital converter (not shown), or by a voltage-to-frequency converter (not shown) which allows the microcomputer to count signal pulses to produce a digital value representative of blood velocity.

In conclusion, the ultrasonic Doppler flow measurement system of the present invention provides reliable sensing of blood flow velocity through a conduit which is usable in a wide variety of different applications. Variations in signal strength due to differing red blood cell concentration and the presence in differing quantities of other particulates such as gas and fat are accommodated. The automatic gain control circuit 24 accommodates variations in signal strength due to red blood cell concentration, while clipping circuit 22 prevents inordinate reduction of gain by the automatic gain control circuit 24 due to extremely large, occasional gas bubbles or fat globules.

Although the present invention has been described in reference to preferred embodiments, workers skilled in the art will recognize that changes may be made in form or detail without departing from the spirit and scope of the invention.

What is claimed is:

1. An ultrasonic flow measurement system for measuring velocity of blood flow through a conduit, the system comprising:

transmitter means for transmitting an ultrasound into the conduit;

receiver means positioned to receive reflected ultrasound, for producing a receiver signal;

means for deriving, from the receiver signal, a Doppler signal having a frequency which varies as a function of velocity of blood flowing through the conduit;

clipping means for limiting the Doppler signal to a predetermined level;

automatic gain control means for controlling amplification of the Doppler signal, as a function of the Doppler signal as limited by the clipping means, to compensate for variations in Doppler signal strength due to variations in red blood cell concentration; and means for converting the Doppler signal, as modified by the clipping means and the automatic gain control means, to an output signal representative of blood flow velocity.

2. The system of claim 1 wherein the predetermined level is essentially comparable to a signal level of the Doppler signal when only red blood cells are present in blood flowing through the conduit.

3. The system of claim 1 wherein the means for converting is a frequency-to-voltage converter.

4. An ultrasonic flow measurement system for measuring velocity of blood flow through a conduit, the system comprising:

means for producing a Doppler signal having a frequency which varies as a function of the velocity of blood flow;

means for controlling amplification of the Doppler signal to compensate for variations in Doppler signal strength due to variations in red blood cell concentration in the blood; and means for preventing inordinate reduction in amplification of the Doppler signal due to presence of particulates in the blood having higher ultrasonic reflectivity than red blood cells.

5. The system of claim 4 wherein the means for preventing limits the Doppler signal to a predetermined level.

6. The system of claim 5 wherein the predetermined level is essentially comparable to a signal level of the Doppler signal when only red blood cells of a known concentration are present in blood passing through the conduit.

* * * * *